United States Patent
Lee et al.

(10) Patent No.: US 7,221,929 B2
(45) Date of Patent: May 22, 2007

(54) HANDLING CHARGING INFORMATION IN INTERWORKING STRUCTURE OF MOBILE COMMUNICATION AND WIRELESS LOCAL AREA NETWORKS

(75) Inventors: Wan-Yeon Lee, Gyeonggi-Do (KR); Woon-Young Yeo, Gyeonggi-Do (KR); Ki-Hyoung Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 227 days.

(21) Appl. No.: 10/682,803

(22) Filed: Oct. 10, 2003

(65) Prior Publication Data

US 2004/0132427 A1 Jul. 8, 2004

(30) Foreign Application Priority Data

Oct. 12, 2002 (KR) .................... 10-2002-0062288
Nov. 11, 2002 (KR) .................... 10-2002-0069770
Nov. 11, 2002 (KR) .................... 10-2002-0069771

(51) Int. Cl.
*H04M 11/00* (2006.01)

(52) U.S. Cl. .............. 455/408; 455/405; 455/406; 455/426.1; 379/114.28; 379/121.03

(58) Field of Classification Search ........... 455/414.3, 455/414.1, 406, 408, 405, 411, 414.4, 426.1, 455/428; 379/114.01, 114.03, 114.28, 115.01, 379/121.02, 121.03, 126; 705/34

See application file for complete search history.

(56) References Cited

U.S. PATENT DOCUMENTS

| | | | |
|---|---|---|---|
| 5,793,762 A * | 8/1998 | Penners et al. ............ 370/389 |
| 6,408,173 B1 * | 6/2002 | Bertrand et al. ............ 455/406 |
| 6,477,644 B1 * | 11/2002 | Turunen ..................... 713/161 |
| 6,493,551 B1 * | 12/2002 | Wang et al. ............. 455/432.1 |
| 6,584,118 B1 * | 6/2003 | Russell et al. .............. 370/466 |
| 6,785,535 B2 * | 8/2004 | Lucidarme et al. ......... 455/406 |
| 6,859,465 B1 * | 2/2005 | Colban ....................... 370/506 |
| 7,092,696 B1 * | 8/2006 | Hosain et al. .............. 455/405 |
| 2002/0012433 A1 * | 1/2002 | Haverinen et al. ......... 380/247 |
| 2002/0037708 A1 * | 3/2002 | McCann et al. ............ 455/411 |
| 2002/0176579 A1 * | 11/2002 | Deshpande et al. ........ 380/270 |
| 2002/0177431 A1 * | 11/2002 | Hamilton et al. ........... 455/406 |
| 2002/0183038 A1 * | 12/2002 | Comstock et al. .......... 455/406 |
| 2003/0157926 A1 * | 8/2003 | Ala-Laurila et al. ....... 455/406 |
| 2004/0053599 A1 * | 3/2004 | Karaoguz et al. .......... 455/408 |
| 2004/0105413 A1 * | 6/2004 | Menon et al. .............. 370/338 |
| 2004/0248547 A1 * | 12/2004 | Philsgard et al. ........... 455/405 |
| 2005/0181760 A1 * | 8/2005 | Karaoguz et al. .......... 455/408 |

FOREIGN PATENT DOCUMENTS

| EP | 1 191 763 A2 | 3/2002 |
|---|---|---|
| JP | 2002-215736 | 8/2002 |
| KR | 2002-0050252 | 6/2002 |
| WO | 01/33781 A1 | 5/2001 |

* cited by examiner

*Primary Examiner*—William Trost
(74) *Attorney, Agent, or Firm*—Ked & Associates, LLP (57) ABSTRACT

When interworking two or more networks, such as a wireless local access network (WLAN) and a mobile communication network, user billing and service charging should be accurately collected and processed. To do so, certain types of service usage and charging information for certain users can be deleted depending upon the type of service provided to the user. Also, service usage and charging information can be periodically collected depending upon the type of service being provided. Furthermore, WLAN wireless access service usage and charging information, as well as mobile communication network service charging information can be collected upon correlation therebetween.

28 Claims, 7 Drawing Sheets

Prior Art

HANDLING CHARGING INFORMATION IN INTERWORKING STRUCTURE OF MOBILE COMMUNICATION AND WIRELESS LOCAL AREA NETWORKS

BACKGROUND OF THE INVENTION

1. Field of the Invention

The present invention relates to an integrated structure of a mobile communication and wireless local area networks, and more particularly, to handling charging (billing) information when both a WLAN service and a mobile communication network service are used.

2. Description of the Related Art

Recently, various techniques for interworking (i.e., integrating or converging) a mobile communication network with a wireless local area network (WLAN) to allow mobile communication network services and WLAN services to be used together are being developed.

Mobile communication networks and wireless local area networks will be considered here for exemplary purposes. However, this is not meant to limit the applicability of the present invention teachings in any way.

Figure 1:
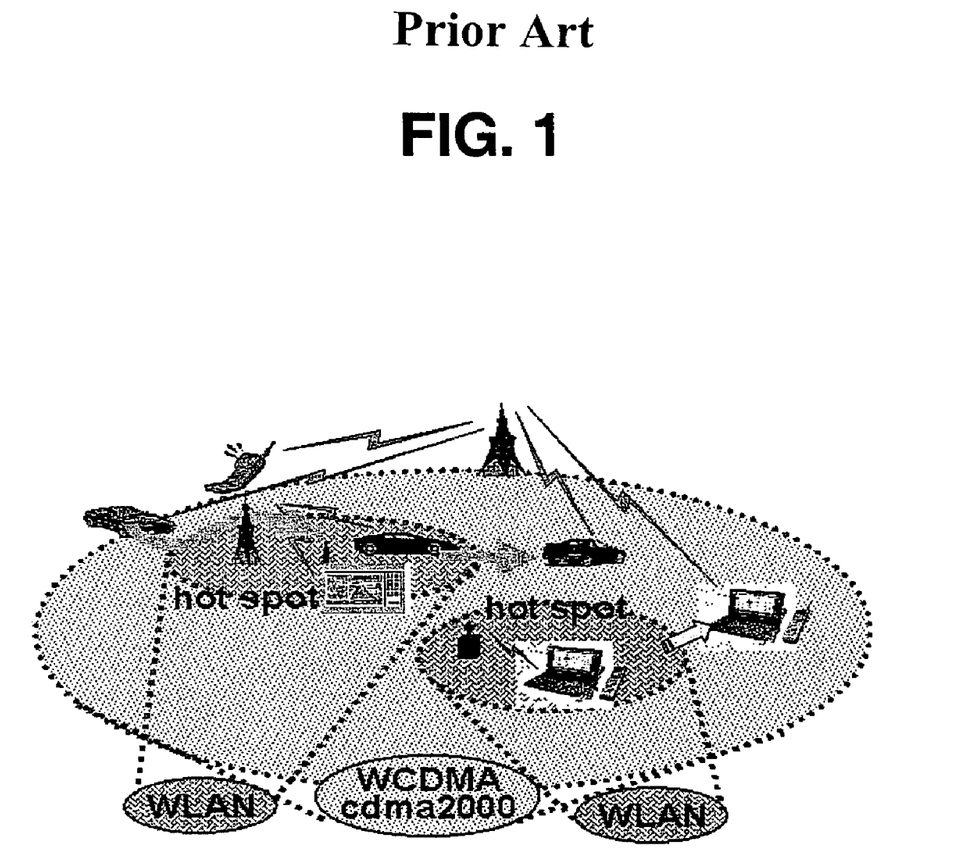
FIG. 1 illustrates an example of how the services of a WLAN and of a mobile communication network can be provided together to various users.

FIG. 1 illustrates an example of how the services of a wireless local area network (WLAN) and of a mobile communication network can be provided together to various users.

As shown in FIG. 1, a WLAN uses IEEE 802.11 standard technology and HIPERLAN technology to support low-cost, high-speed wireless communications in "hot spot" regions, such as airports or schools, where there are many users. Also, a mobile communication network employs third generation technology, such as cdma2000 or WCDMA, to support high mobility wireless communications.

In the interworking network structure of FIG. 1, a user employing a single wireless communication device (e.g., user equipment (UE)), can access a low-cost WLAN in a hot spot region that supports WLAN wireless access services, while in other regions, the user can access a mobile communication network to receive wireless communication services. Here, the interworking network structures can be classified into two types according to the services requested by the user as follows.

The first type of interworking network structure is a configuration in which the authentication and charging (billing) for usage of the WLAN and the mobile communication network are combined and managed, and the WLAN and mobile communication network service provision are operated independently. Namely, the authentication and charging for the WLAN communication service are provided through the authentication server and the charging server of the mobile communication network.

The second interworking network structure is a configuration in which authentication and charging are combined and managed as in the first interworking network structure, while additional services exclusively provided from the mobile communication network is provided to the user via a WLAN wireless access service. Namely, in the second interworking network structure, while using WLAN wireless access services, additional services provided by the mobile communication network are also provided together therewith.

The related art and the present invention will be described with reference to the second type of interworking network structure shown in FIGS. 2 and 3, comprising a mobile communication network and a WLAN are connected, wherein a 3GPP home network 220 is used as the mobile communication network for exemplary purposes.

Figure 2:
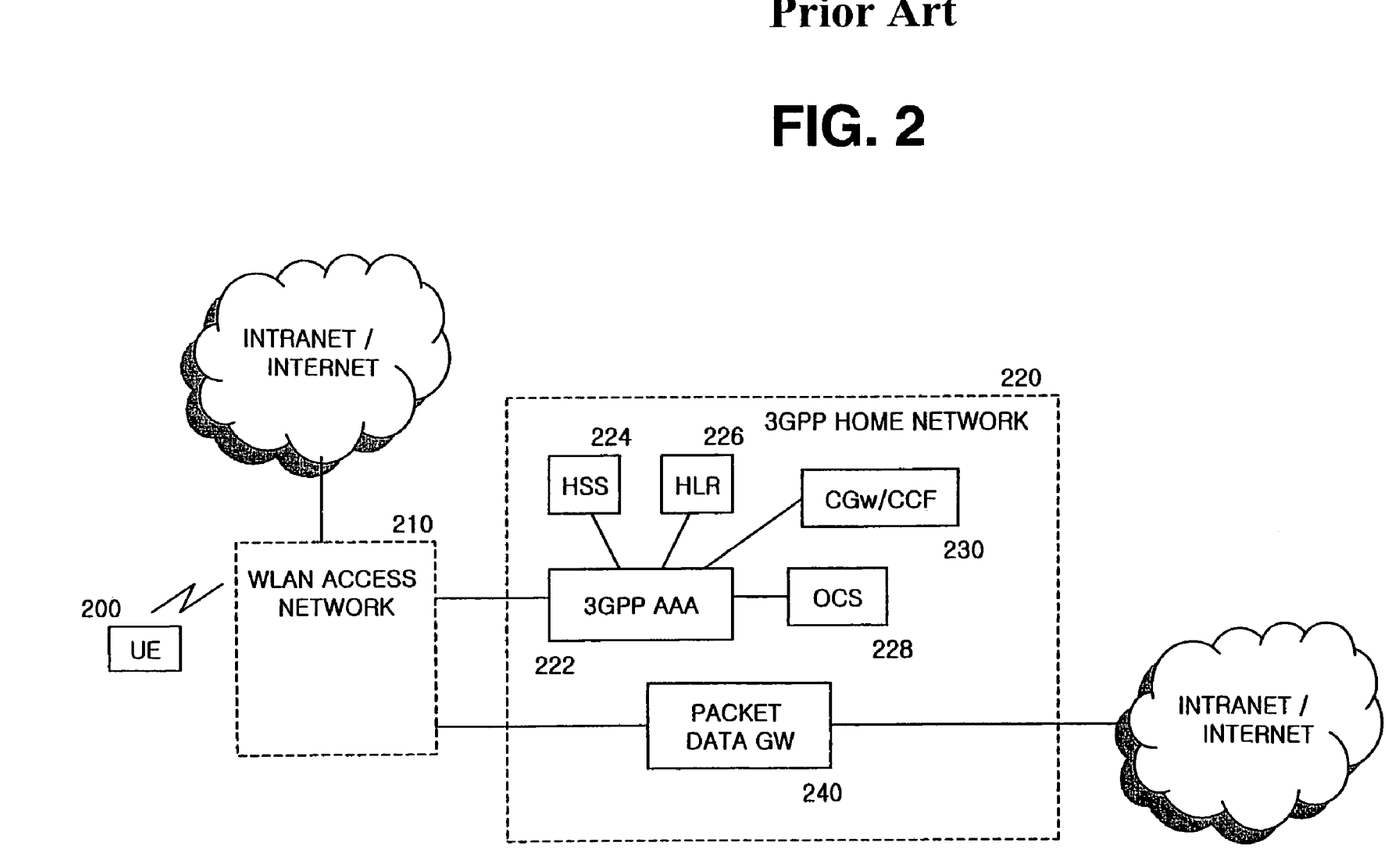
FIG. 2 illustrates an example of how a WLAN and a mobile communication network may be interworked.

In FIG. 2, there is an AAA (Authentication, Authorization, Accounting) server 222, which is a network element of the 3GPP home network (mobile communication network) 220 responsible for handling communication usage authorization and charging information for wireless communication users. The HSS/HLR (Home Location Register/Home Subscriber System) 224, 226, connected with the AAA server 222, are network elements that manage information regarding the users registered with the mobile communication network. The OCS (Online Charging System) 228, connected to the AAA server 222, is a network element that manages in an on-line manner the communication service usage amount so that pre-paid users are provided with services that are limited to their pre-paid budget. The CGw/CCF (Charging Gateway/Charging Collection Function) 230, connected with the AAA server 222, is a network element that collects and manages charging information for users. The Packet Data Gateway (PDGW) 240 is a node to allow access from the WLAN 210 to the services provided by the mobile communication network 220.

In the interworking network of FIG. 2, user equipment (UE) 200 may request a service from the 3GPP home network 220 via a WLAN. Here, user data traffic is sent not only to the WLAN access network 210, but also to the packet data gateway 240 in the 3GPP home network 220. When WLAN communication services and services of the mobile communication network are both provided during a single session (i.e., in one call connection), charging (billing) for both services must be applied properly.

In the interworking network structure of FIG. 2, charging information for the communication service of a related art WLAN is generated at the WLAN access network 210 and sent to the CGw/CCF 230 via the AAA server 222.

Thereafter, the CGw/CCF 230 uses the charging information provided by the AAA 222 server to calculate the service usage charges of using the communication services of the WLAN and using the additional services of the mobile communication network.

Figure 3:
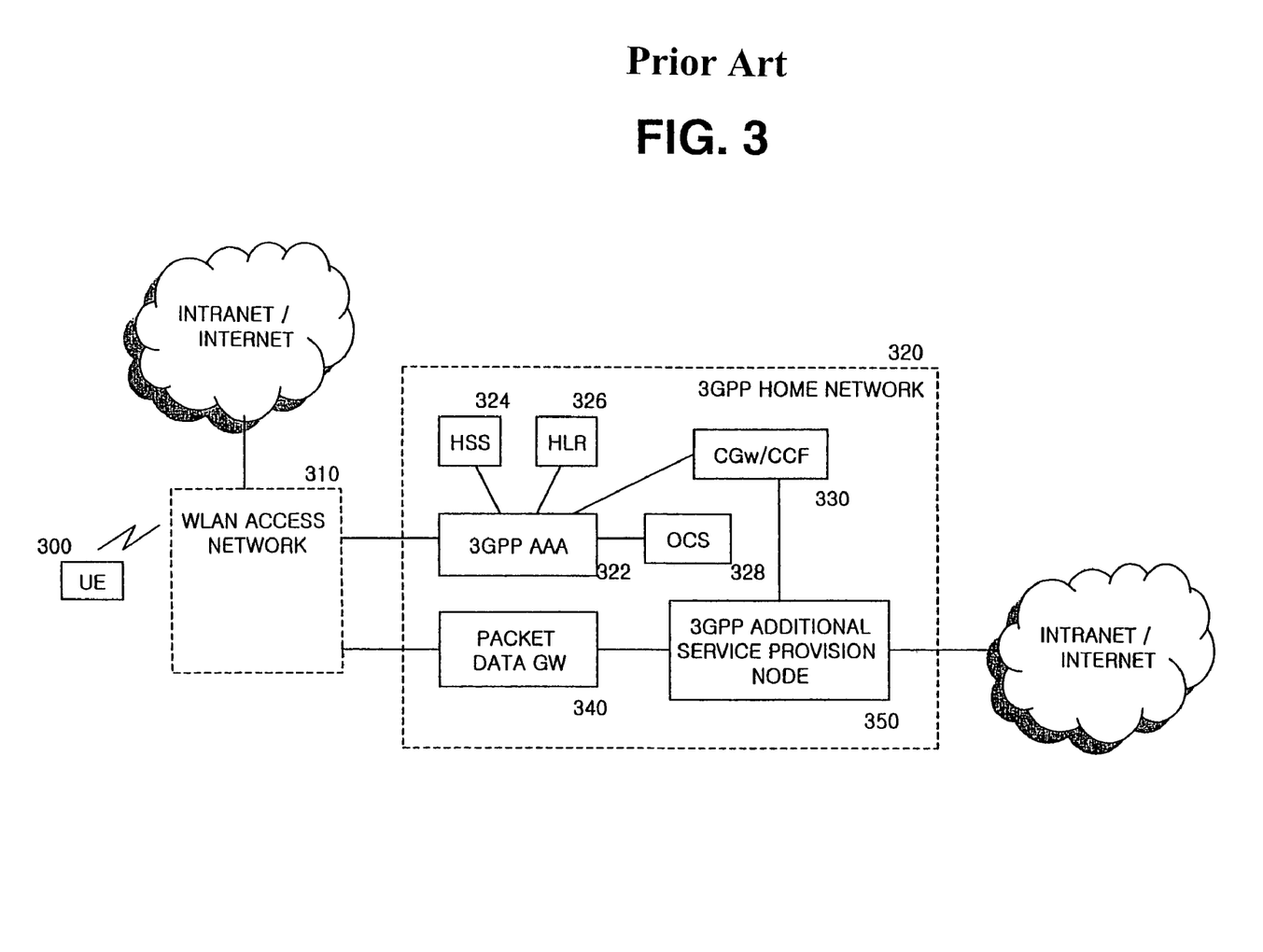
FIG. 3 illustrates another example of how a WLAN and a mobile communication network may be interworked.

FIG. 3 illustrates the second type of interworking network structure wherein the mobile communication network provides additional services. The structure of FIG. 3 is the same as that of FIG. 2, but with the addition of a mobile (communication) network additional service provision node 350 connected with the PDGW 340 and the CGw/CCF 330. Here, the mobile communication network additional service provision node supports the providing of additional services, such as Internet protocol (IP) multimedia service (IMS), multimedia message service (MMS), multicast and broadcast multimedia service (MBMS) or other multimedia services, by the mobile communication network.

In FIG. 3, similar to FIG. 2, user equipment (UE) 300 may request an additional service from the 3GPP home network 320 via a WLAN. Here, user data traffic is sent from the additional service provision node 350 of the 3GPP home network 320 to the UE 300 via the PDGW 340 and the WLAN access network 310. When additional services of the mobile communication network are provided via the WLAN access network during a single session (i.e., in one call connection), charging (billing) for usage of WLAN access network services and charging (billing) for usage of additional services of the mobile communication network must be applied properly.

In the interworking network structure of FIG. 3, charging information for the communication service of a related art WLAN is generated at the WLAN access network, 310 and sent to the CGw/CCF 330 via the AAA server 322. Meanwhile, the charging information for the additional service of the mobile communication network is generated at the additional service provision node 350 and sent to the CGw./CCF 330.

Thereafter, the CGw/CCF 330 uses the charging information provided by the AAA 322 server and the additional service provision node 350, respectively, to calculate the service usage charges of using the wireless access services of the WLAN and using the additional services of the mobile communication network.

For interworking networks, efforts are being made to allow the charging functions ordinarily provided by the WLAN, to be handled by the mobile communication network. Related art service charging and billing methods consider two types of charging functions; pre-payment charging and post-payment charging.

Figure 4A:
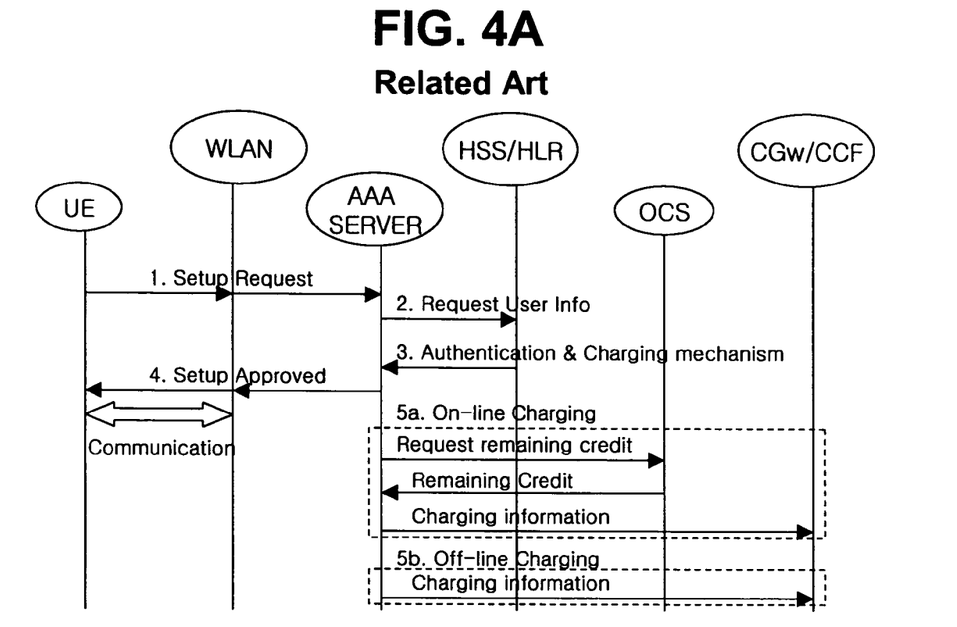
FIGS. 4A and 4B illustrate one example of service authorization and charging methods according to the related art and the present invention, respectively.

FIG. 4A illustrates one example of service authorization and charging methods according to the related art. Referring to FIG. 4A, when a user (customer or subscriber) requests setup (establishment) of a call for communication with the interworking network (step 1); the AAA server requests from the HSS/HLR, user information that is necessary for authentication (step 2); the HSS/HLR sends the requested user information to the AAA server (step 3); and the AAA server authenticates the user according to the user information.

Then, for pre-payment users, the AAA server inquires the OCS regarding the remaining balance for the user to ensure that the user does not exceed the pre-paid limit of his service usage (step 5a).

For all users, the AAA server informs the CGw/CCF of the service usage amount and then after a certain period of time, the entire service use amount is confirmed and the charges associated with that use is charged and billed to the user (step 5b).

Figure 5A:
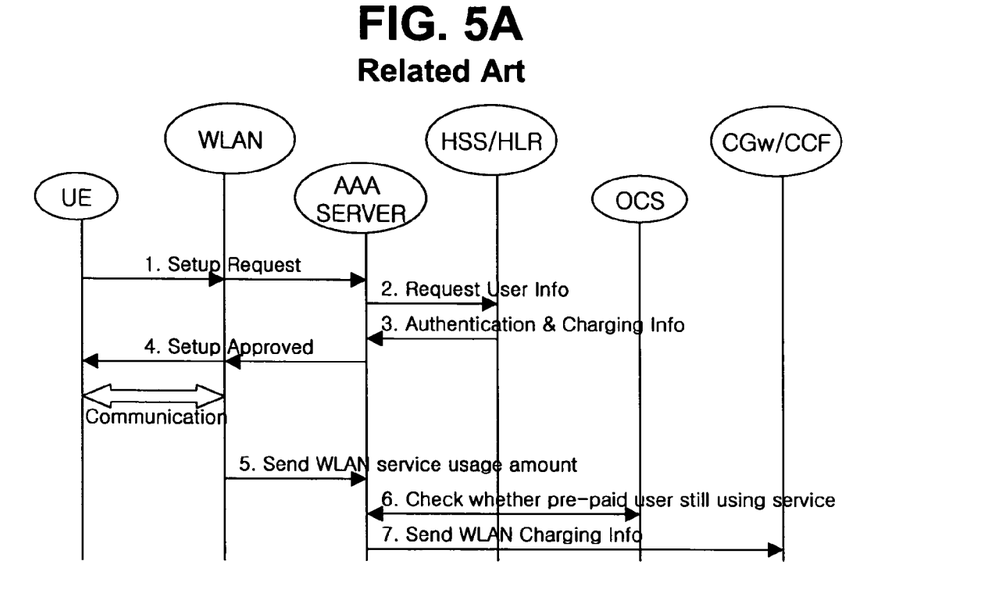
FIGS. 5A and 5B illustrate another example of service authorization and charging methods according to the related art and the present invention, respectively.

FIG. 5A illustrates another example of service authorization and charging methods according to the related art. FIG. 5A shows a process of collecting charging information for information related to charging (communication service usage amount) according to service usage after the setup and authentication steps are successfully completed for a user wishing to receive wireless access services from the WLAN and services from the mobile communication network.

When a user requests to use the interworking network (step 1), the AAA server obtains authentication information and charging method information for the user from the HSS.HLR, and performs authorization. Once authorization is successful, the AM server informs the WLAN about the approved authorization and the pre-set transmitting period for sending the charging information (steps 2 and 3). The WLAN access network then allows communication to begin and the communication between the user and the network commences (step 4).

Once communication begins, the WLAN periodically sends the service usage amount to the AAA server (step 5). Then, the AAA server, according to the charging method for the user, cooperates with the OCS to check whether the service usage amount is within the pre-paid amount for pre-payment users (step 6). If the service usage amount exceeds the pre-paid amount, the user is informed via the WLAN that communications shall end. For all users, the AAA server sends the service usage amount information from the WLAN to the CGw/CCF (step 7).

Figure 6A:
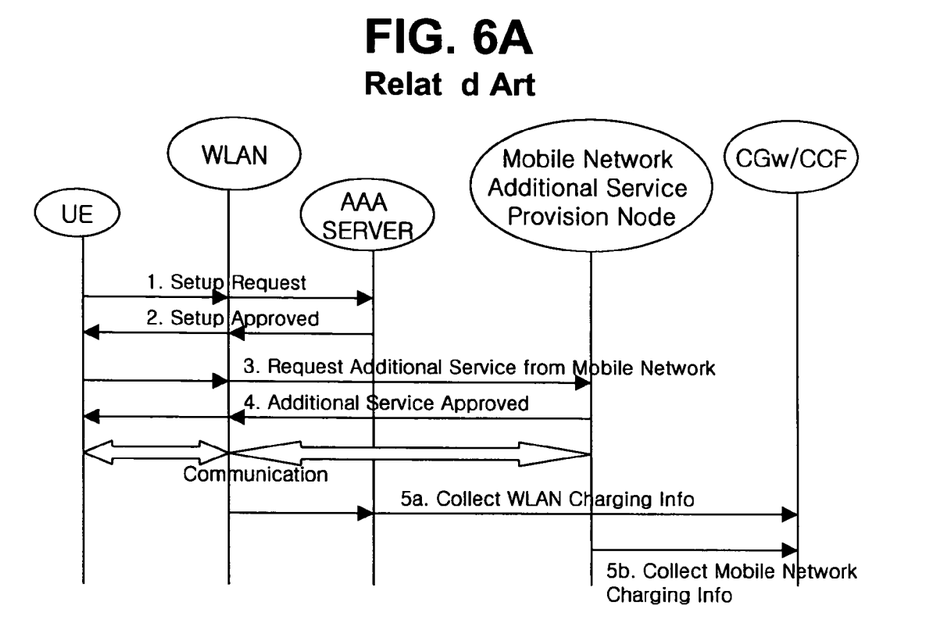
FIGS. 6A and 6B illustrate an example service authorization and charging methods according to the related art and the present invention, respectively, for providing additional services from the mobile communication network.

FIG. 6A is a flow diagram showing the steps in providing an additional service from the mobile communication network via the communication service of the WLAN.

In steps 1 and 2, WLAN validation and authentication of the communication service for the user takes place, and in steps 3 and 4, the authentication for the additional service of the mobile communication network occurs. Here, the use authentication of the communication service at the WLAN is performed at the AAA server, while the use authentication of the additional service of the mobile communication network is performed by the additional service provision node in the 3GPP home network.

Thereafter, when actual communication begins and both the WLAN wireless access service and the additional service of the mobile communication network are provided during a single session (one call connection), as shown in steps 5a and 5b, the CGw/CCF of the mobile communication network periodically collects the charging information of the WLAN and the mobile communication network and calculates the use charges for the WLAN wireless access service and the additional service of the mobile communication network.

In the CGw/CCF, the use charges are calculated on the basis of the amount of communication service and amount of additional service during a user's session (one call connection). The charging information are collected and calculated by using the charging information for the communication service of the WLAN and the charging information for the additional service of the mobile communication network (also based on the user's session), that are recorded and used as identifiers (or standard values) for calculation.

The CGw/CCF collects the charging information from the WLAN and the mobile communication network by using a session ID and a charging ID as identifiers for discriminating between the charging information per each user session for the WLAN and the mobile communication network. In the WLAN, the session ID is generated by an access point (AP) existing within the WLAN access network, and the charging ID is generated by the additional service provision node within the mobile communication network.

Here, the session ID provided by the WLAN can differ depending upon the protocol used in the WLAN and can have a length of, for example, less than 4 bytes, while the charging ID provided by the mobile communication network can have a length of, for example, 4 bytes or more.

As described above, regarding the charging information in an interworking network of a wireless communication system, the charging information of the WLAN wireless access service and that of the mobile communication network additional service are independently collected. Here, the charging information for the WLAN wireless access service employing a session ID as an identifier (standard value) and is sent to the CGw/CCF via the AAA server in the WLAN access network, while the charging information for the mobile communication network additional service employing the charging ID is sent from the additional service provision node directly to the CGw/CCF.

However, in the second type of interworking network structure, when the user is provided with additional services from the mobile communication network via the WLAN wireless access service, the charging information for the WLAN wireless access service and for the mobile communication network additional service, respectively, are independently collected. Also, respectively different identifiers are uses to distinguish the charging information of the WLAN and that of the mobile communication network according to each session.

Accordingly, even if the charging information generated for a single session from the WLAN and the mobile communication network are collected by the CGw/CCF, because the CGw/CCF is not aware of any relationship between the session ID and the charging ID, the CGw/CCF cannot determine that the charging information from the AAA server and the additional service provision node, respectively, are for the same session. Namely, the CGw/CCF cannot determine that the two types of charging information were generated for a single connection between the user and the two networks. This type of problem exists not only for IMS services, but also for 3GPP services such as MMS and MBMS.

As such, when supporting an additional service provided by the mobile communication network via the WLAN wireless access service, the network provider has difficulties in accurately collecting and managing charging information for users of the interworking network. In particular, the network provider cannot calculate accurate charges per each session, and thus cannot provide accurate billing per session to interworking network users.

SUMMARY OF THE INVENTION

One aspect of the invention involves the recognition by the inventors that the related art techniques in integrating different networks have certain disadvantages.

Namely, related art systems and methods for integrated networks only accommodate two types of billing options, i.e., pre-payment billing and post-payment (or normal) billing. However, as the types of data services to be provided to users increases, different types of service usage tracking (measuring) and service usage billing (charging) options also need to be considered and handled.

Also, related art systems and methods for integrated networks perform the transmission of charging information with the same period regardless of the charging mechanism such as pre-paid, post-paid, and flat rate charging. The related art charging information transmission scheme, which does not consider the various charging mechanisms, may generate redundant data traffic and deteriorate the network performance. Therefore, it is necessary to determine the period of the transmission of charging information with reference to charging mechanisms.

Furthermore, related art systems and methods for integrated networks only perform service usage measuring and charging in an independent manner. This is problematic because, when the wireless access services of a WLAN and additional services of a mobile communication network are both provided to users, a network provider will have difficulties in determining how much of each service was used and thus accurate billing for users cannot be properly achieved.

To address the above and other shortcomings of the related art, the present invention provides the following.

Some embodiments of the invention allow deleting of certain types of service usage and charging information for certain users depending upon the type of service provided to the user.

Some embodiments of the invention allow periodic (or cyclical) gathering (collecting) of service usage and charging information depending upon the type of service being provided.

Some embodiments of the invention allow gathering (collecting) of WLAN wireless access service usage and charging information and mobile communication network service charging information upon correlation therebetween.

Additional advantages and features of the invention will be set forth in part in the description which follows and in part will become apparent to those having ordinary skill in the art upon examination of the following or may be learned from practice of the invention. The advantages and features of the invention may be realized and attained as particularly pointed out in the appended claims.

DETAILED DESCRIPTION OF THE PREFERRED EMBODIMENTS

The present invention is described for interworking a mobile communication network and a WLAN for exemplary purposes. Nevertheless, the present invention can be also applied to other types of systems and networks operating under different standards. Embodiments of the present invention will now be described with reference to the accompanying drawings.

The embodiments of the present invention provide a method for billing a user for using a data service provided by an interworking network structure including a first network and a second network. Namely, the method can be implemented by receiving by a first network a request to access a data service provided by the second network, determining whether the service to be provided requires payment from the user, and approving the request to access the service.

Thereafter, by providing the service to the user based upon the determination of payment and approval of the request, collecting charging information from the first and second networks based upon the determination of payment and the service being provided, processing the collected charging information; and finally billing the user in accordance with the processed charging information, completes the main procedures of the present invention.

In more detail, the present invention provides different specific procedures for handling charging information for users with different payment options. Examples of such specific procedures are as follows.

Figure 4B:
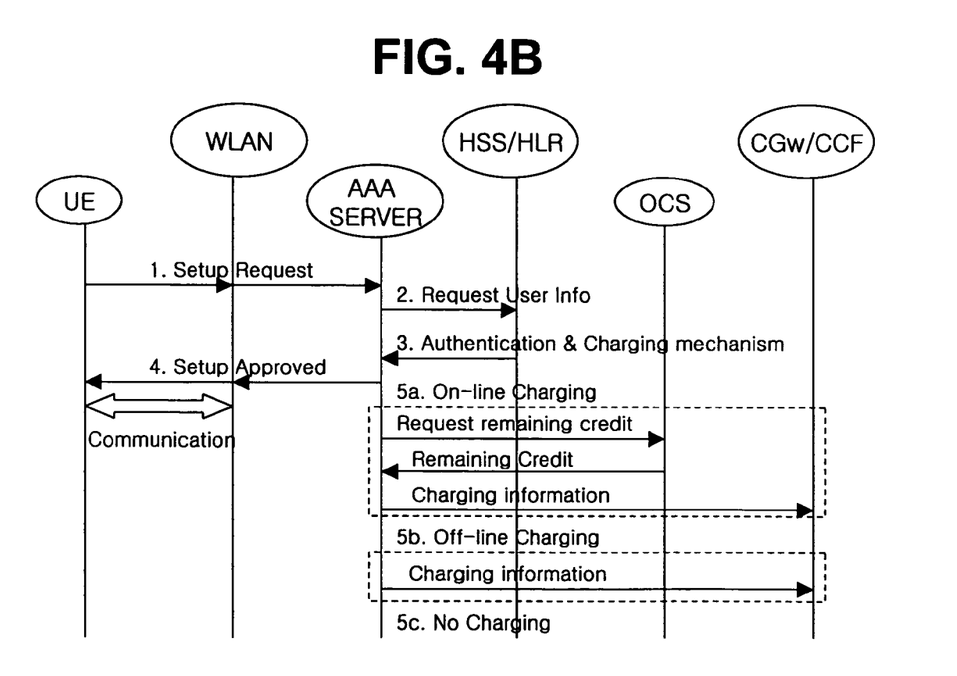

FIG. 4B

The present invention suggests certain procedures to support various WLAN charging methods for an interworking network environment. In addition to pre-payment and post-payment options for the user, flat rate payment or no payment options, as well as other payment options for the users are supported by the present invention. An example of a no payment option may apply to a corporate Intranet service allowing company employees to access various services without charging them.

According to an embodiment of the present invention, a "charging information collection delete function" is provided to the mobile communication network (e.g., within the AAA server hardware and/or software) in order to handle charging information for users of a WLAN under a flat rate payment charging method for service usage or to users of a corporate WLAN (no payment for service usage). These users already have their charging amounts previously determined (e.g., either a flat-rate fixed price or no fee required), so charging information need not be collected for such users. Thus, the present invention provides a three-option method for handling charging information, including on-line charging information collection, off-line charging information collection and no collection of charging information. This is in contrast to the two-option method (on-line charging information collection and off-line charging information collection) of the related art.

To achieve the above features, the present invention proposes the procedures shown in FIG. 4B. Upon receiving a call setup request to allow a user to use the wireless access services of the WLAN (step 1), the mobile communication network processes this request via the AAA server and receives the information of authentication and charging mechanism from the HSS/HLR (steps 2 and 3). Then, the authentication information is used to determine the validity of the user, and usage of the WLAN wireless access service is approved accordingly (step 4).

When the user begins using the requested service of the WLAN, such usage is checked and for on-line charged users, such as pre-payment users, the AAA server acquires the remained credit of the user from the OCS. The AAA server continuously decreases the credit by a given amount as the service provides and will halt the WLAN wireless access service if the credit is exhausted. During the WLAN wireless access service, the usage amount is reported to the CGw/CCF periodically. For off-line charged users, such as post-payment users, the usage amount is reported to the CGw/CCF periodically as is in the case of online charging. For flat rate payment users or for user that need not pay (free usage), even if charging information is collected from the WLAN, the collected information is not sent to any other network element. Here, the AAA server checks the type of payment option for a particular user by cooperating with the HSS/HLR, and one of the above-described three charging information handling methods is selected.

Figure 5B:
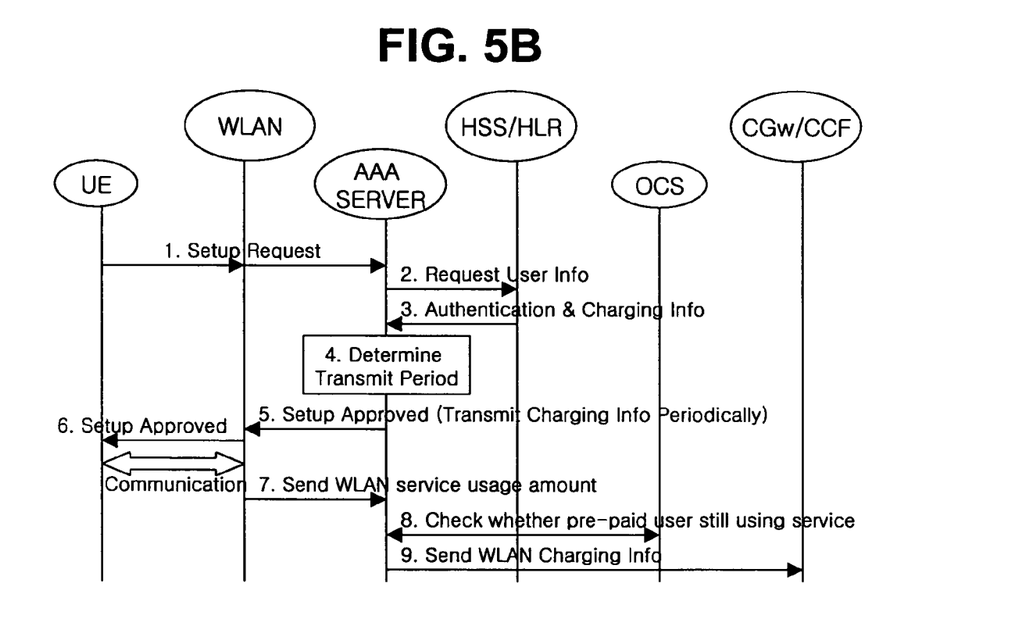

FIG. 5B

With reference to FIG. 5B, according to another embodiment of the present invention, when authentication is approved by the AAA server based upon the information of authentication and charging method (mechanism) from the HSS/HLR (steps 1 through 3), the AAA server additionally determines, in accordance with the applicable charging method for the user, a transmission period used in sending service usage amount information to the CGw/CCF (step 4). This determined transmission period is informed to the WLAN, which then (during subsequent communication between the user and the WLAN) periodically sends the user's communication service usage amount back to the AAA server according to the determined transmission period (steps 5 through 7).

In more detail, referring to FIG. 5B, in steps 1 through 3 are the same as those of the related art. However, upon authorization approval, the charging method obtained from the HHS/HLR is referred to and the transmission period for sending charging information is determined by the AAA server (step 4). Then, the AAA server informs the WLAN of the authentication approval and the transmission period to be used for the charging information.

Thereafter, steps 6 though 9 are performed in the same manner as performing steps 4 through 9 of the related art (FIG. 5A), and thus the details thereof will be omitted.

The AAA server can determine the transmission period for the charging information in the following manner. The network provider can set the transmission period based upon the types of charging methods being supported, and input this information into the AAA server. Thereafter, the AAA server can proceed to handle charging information by selecting the appropriate charging information transmission period. Different types of user charging methods can be stored in the HSS/HLR. Normal (or post-payment) charging, pre-paid charging, flat-rate charging, and "hot billing" (i.e., charging the user in real time) are just some examples.

Figure 6B:
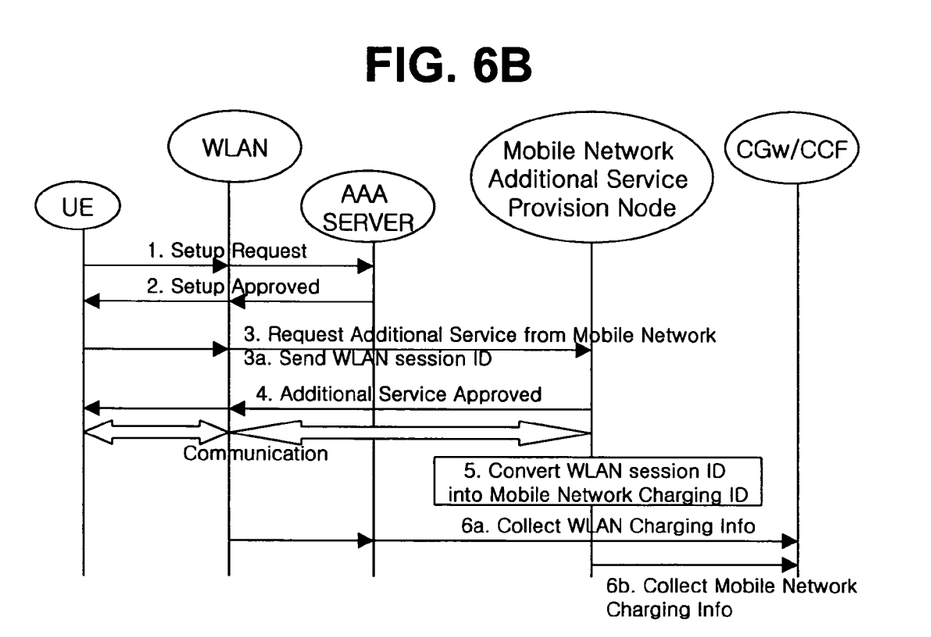
Figure 7:
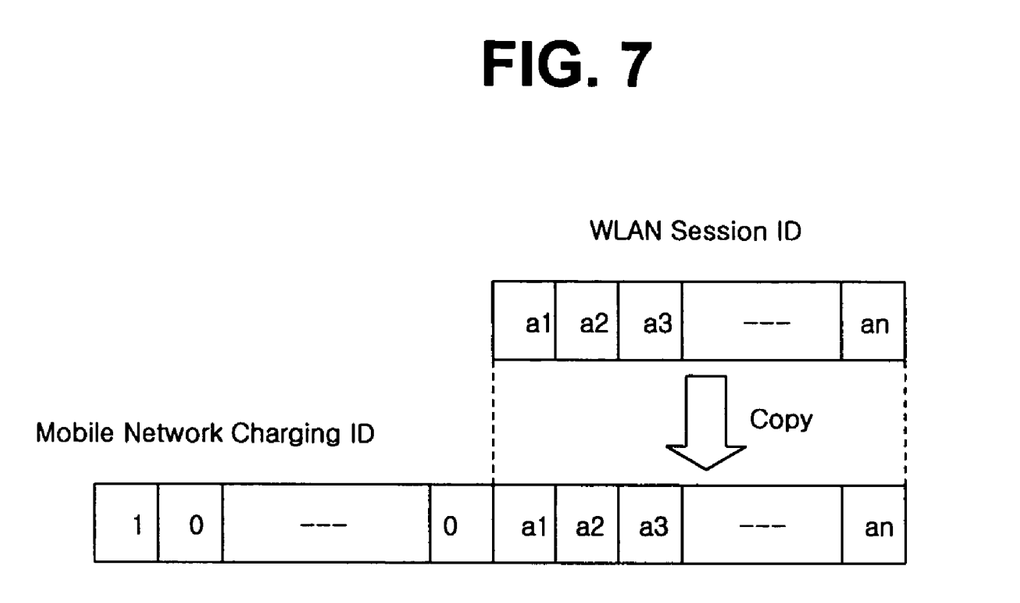
FIG. 7 illustrates an example of how a WLAN session ID is converted into a mobile communication network charging information ID.

FIGS. 6B and 7

In general, in order for a network provider to provide an accurate list of charges to a communication user, the time of a session (one call connection) and charges for that session must be accurately collected and maintained.

According to another embodiment of the present invention related to an interworking network structure in which WLAN wireless access services and mobile communication network services are both used, when a user is provided with additional services provided by the mobile communication network via the WLAN wireless access service, a scheme for correlating, per each session, the charging information of the WLAN wireless access service and the charging information of the mobile communication network. Namely, the present invention allows, for a single session, a correlation between the charging information generated for the WLAN wireless access service and the charging information generated for the mobile communication network to be provided to the network provider.

Thus, in the present invention, the charging identifier of the WLAN is provided to the additional service provision node of the mobile communication network, so that the charging information of the WLAN wireless access service and the charging information for the mobile communication network are correlated together for accurate collecting of charging information per each session used by the user. In other words, for those sessions in which both a WLAN wireless access service and a mobile communication network additional service are used, the same charging identifier is used for both the WLAN and the mobile communication network.

To correlate the charging information of the WLAN wireless access service and that of the mobile communication network additional service, the present invention includes a step of sending a WLAN charging ID from the WLAN to the mobile communication network additional service provision node. Here, a session ID may also be used for the WLAN charging ID, while the session ID and the WLAN charging ID may be different values is such is desirable.

The above step can be performed when the WLAN, in response to the user, requests to the mobile communication network additional service provision node to provide additional services, and the charging ID of the WLAN can be inserted into the additional service request message and transmitted.

Also, the present invention can include a step of mapping (converting) the charging ID sent from the WLAN into a charging ID for the mobile communication network in order to achieve the correlation between the charging information of the WLAN wireless access service and that of the mobile communication network additional service.

Preferably, this mapping (converting) step is performed by the mobile communication network additional service provision node, and various methods for mapping (converting) the WLAN charging ID into the mobile communication network charging ID can be employed (to create a correlated charging ID).

For example, the lengths of the WLAN charging ID and the mobile communication network charging ID can be compared, and the mobile communication network charging ID can be generated based upon the comparison.

Namely, if the WLAN charging ID and the mobile communication network charging ID have the same length, the WLAN charging ID can merely replace the mobile (communication) network charging ID to generate a correlated charging ID.

If the WLAN charging ID length is less than the length of the mobile communication network charging ID, the WLAN charging ID can be copied into a portion of the mobile communication network charging ID, and then specific values may be inserted into the remaining bits to create a correlated charging ID. Here, the first bit value of the correlated charging ID indicated whether the charging information is that for a WLAN wireless access service or that for a mobile communication network additional service.

FIG. 7 shows an example where a session ID being used as the WLAN charging ID having a length that is shorter than the mobile communication network charging ID, and the WLAN session ID is mapped into the mobile communication network charging ID.

A shown in FIG. 7, after the WLAN session ID is copied into the mobile communication network charging ID, the value 0 (zero) is inserted into all bits except the first bit. In this example, if the first bit of the charging ID is 1 (one), this indicates that the charging information pertains to that of the WLAN wireless access service, while a first bit of 0 (zero) indicates that the charging information pertains to that of the mobile communication network additional service.

Thus, as shown in FIG. 6B, the newly inserted procedures of the present invention include the sending of the WLAN charging ID to the mobile communication network additional service provision node (step 3a), and the converting of the WLAN charging ID into a mobile communication network charging ID performed by the mobile communication network additional service provision node (step 5). All other steps can be performed as done in the related art (FIG. 6A).

Accordingly, as shown in FIG. 6B, authorization for the user to use the WLAN services is performed (steps 1 and 2), and additional services provided by the mobile communication network is authorized (steps 3 and 4). Here, unlike the related art method (FIG. 6A), a WLAN charging ID is also sent to the mobile communication network additional service provision node (step 3a).

Thereafter, when the additional services are provided to the user, the mobile communication network additional service provision node maps (converts) the WLAN charging (session) ID to form a mobile communication network charging ID (step 5). Then, using the charging ID as an identifier, the charging information is sent to the CGw/CCF.

Thus, when a WLAN wireless access service and an additional service of the mobile communication network are both provided during a single session (one call connection), the CGw/CCF periodically collects the charging information from the WLAN and from the mobile communication network (steps 6a and 6b).

After the charging information is collected, the CGw/CCF compares the charging ID of the WLAN and that of the mobile communication network to determine whether the charging information had been generated during the same session. Thus, based upon this determination, the CGw/CCF calculates the WLAN wireless access service usage fee and the mobile communication network additional service usage fee. Accordingly, the interworking network provider can accurately calculate the service usage fees (charges) during each session for users who used wireless access services of the WLAN and additional services of the mobile communication network.

Thus, for sessions that use both WLAN wireless access services and additional services of the mobile communication network, the same charging identifier is used for both the WLAN and the mobile communication network, and charging information (communication service usage amount information) is collected to allow more accurate calculation of service usage charges.

The foregoing embodiments and advantages are merely exemplary and are not to be construed as limiting the present invention. The present teachings can be readily applied to other types of systems and methods. The description of the present invention is intended to be illustrative, and not to limit the scope of the claims. Many alternatives, modifications, and variations will be apparent to those skilled in the art.

What is claimed is:

1. A method of collecting charging information for both use of services from a wireless local area network (WLAN) and use of services from a mobile communication network, the method comprising:

using a WLAN service provided by a WLAN network;

using additional services simultaneously during a same session with the use of the WLAN service, the additional services being provided by a mobile communication network through an additional service provision node of the mobile communication network and through the WLAN network, the additional services comprising data services with a third network;

sending bits of a WLAN charging identifier (ID) to the additional service provision node of the mobile communication network; and mapping the bits of the WLAN charging ID into bits of a mobile communication network charging ID, in order to facilitate the collecting of charging information for both the use of the WLAN service provided by the WLAN and the use of the additional services provided by the mobile communication network, wherein if the WLAN charging ID length is less than the length of the mobile communication network charging ID, the WLAN charging ID can be copied into a portion of the mobile communication network charging ID and then specific values may be inserted into the remaining bits to create a correlated charging ID, and wherein an internetworking provider can accurately calculate usage fees during each session for users using wireless access services of the WLAN network and additional services of the mobile communication network.

2. The method of claim 1, wherein the mobile communication network charging ID includes a specific data bit to indicate whether the charging information is from the WLAN network or from the mobile communication network.

3. The method of claim 1, further comprising:
generating the mobile communication network charging ID by comparing bit lengths of the WLAN charging ID bits and the mobile communication network charging ID bits.

4. The method of claim 1, further comprising:
replacing the WLAN charging ID with the mobile communication network charging ID, if the length of the WLAN charging ID bits is equal to the length of the mobile communication network charging ID bits.

5. The method of claim 1, further comprising:
copying the WLAN charging ID into a portion of the mobile communication network charging ID, if the length of the WLAN charging ID bits is less than the length of the mobile communication network charging ID bits.

6. The method of claim 5, further comprising: inserting specific data bits into any remaining bits of the mobile communication network charging ID bits.

7. The method of claim 5, further comprising:
inserting a bit value of 0 into all remaining bits of the mobile communication network charging ID bits except a first bit.

8. The method of claim 7, further comprising:
indicating the charging information is from the WLAN network when the first bit is 1.

9. The method of claim 7, further comprising:
indicating the charging information is from the mobile communication network when the first bit is 0.

10. A method of collecting charging information for an interworking network including a wireless local area network (WLAN) and a mobile communication network, the method comprising:
using a WLAN service provided by a WLAN network;
using services provided by a mobile communication network simultaneously during a same session with the use of the WLAN service and through the WLAN network, the services comprising data services with a third network;
sending charging identifier (ID) bits of the WLAN service to the mobile communication network;
mapping the charging ID bits of the WLAN service into bits of a mobile communication network charging ID to generate a charging ID bits for the mobile communication network service; and
collecting charging information for both use of the WLAN service and use of the mobile communication network service, by using the generated charging ID bits of the mobile communication network service,
wherein if the WLAN charging ID length is less than the length of the mobile communication network charging ID, the WLAN charging ID can be copied into a portion of the mobile communication network charging ID and then specific values may be inserted into the remaining bits to create a correlated charging ID, and
wherein an internetworking provider can accurately calculate usage fees during each session for users using wireless access services of the WLAN network and additional services of the mobile communication network.

11. The method of claim 10, further comprising:
generating a mobile communication network charging ID by comparing the lengths of the WLAN charging ID bits and of the mobile communication charging ID bits.

12. The method of claim 10, further comprising:
replacing the WEAN charging ID with the mobile communication network charging ID, if the length of WEAN charging ID bits is equal to the length of the mobile communication network charging ID bits.

13. The method of claim 10, further comprising:
copying the WEAN charging ID into a portion of the mobile communication network charging ID, if the length of the WEAN charging ID bits is less than the length of the mobile communication network charging ID bits.

14. The method of claim 13, further comprising: inserting specific data bits into any remain bits of the mobile communication network charging ID bits.

15. The method of claim 13, further comprising:
padding certain reserved bits of the mobile communication network charging ID.

16. An interworking network structure including a first network and a second network for billing a user, the network structure comprising:
a first network, the first network providing a first service to a user, the first network receiving a request from the user to access a data service provided by the second network, the data service comprising transferring data between the user and a third network via the second network and through the first network and simultaneously during a same session with the providing of the first service;
an authentication, authorization, accounting (AAA) server in the second network and connected to the first network to determine whether the data service to be provided requires payment from the user upon cooperation with a home subscriber system/home location register (HSS/HLR) connected to the AAA server, and to approve the request to access the data service, and to provide the data service to the user based upon the determination of payment and approval of the request;
a charging gateway/charging collection function (CGw/CCF) element connected to the AAA server to collect a charging information from the first and second networks for use of the first service and the data service based upon the determination of payment and the data service being provided at AAA server, and
a second network element connected with the first network to process the collected charging information, which was generated by mapping bits of a first network charging ID associated with use of the first service into of a second network charging ID associated with use of the data service; and to bill the user in accordance with the processed charging information,
wherein if the first network charging ID length is less than the length of the second network charging ID, the first network charging ID can be copied into a portion of the second network charging ID and then specific values may be inserted into the remaining bits to create a correlated charging ID, and wherein an internetworking provider can accurately calculate usage fees during each session for users using wireless access services of the first network and additional services of the second network.

17. The network of claim 16, wherein the first network is a wireless local area network (WLAN).

18. The network of claim 16, wherein the second network is a mobile communication network.

19. The network of claim 18, wherein the second network element is a mobile communication network additional service provision node.

20. The network of claim 16, wherein the second network charging ID includes a specific data bit to indicate whether the charging information is from the first network or from the second network.

21. The network of claim 16, further comprising:
generating the second network charging ID by comparing the lengths of the first charging ID bits and of the second charging ID bits.

22. The network of claim 16, further comprising:
replacing the first network charging ID with the second network charging ID, if a bit length of the first network charging ID bits is equal to the bit length of the second network charging ID bits.

23. The network of claim 16, further comprising:
copying the first network charging ID into a portion of the second network charging ID, if a bit length of the first network charging ID bits is less than the bit length of the second network charging ID bits.

24. The network of claim 23, further comprising:
inserting specific data bits into any remain bits of the second network charging ID.

25. The network of claim 23, further comprising:
padding certain reserved bits of the second network charging ID.

26. The network of claim 16, wherein the data service includes at least one of an Internet protocol multimedia service (IMS), a multimedia message service (MMS) or other multimedia service.

27. The network of claim 16, further comprising:
billing the user for using the data service during one call connection.

28. The network of claim 16, wherein the charging ID of the first network is provided to the additional service provision node of the second network.

* * * * *